United States Patent
Sohmshetty et al.

(10) Patent No.: US 11,348,355 B1
(45) Date of Patent: May 31, 2022

(54) METHOD AND SYSTEM FOR MONITORING MANUFACTURING OPERATIONS USING COMPUTER VISION FOR HUMAN PERFORMED TASKS

(71) Applicant: Ford Global Technologies, LLC, Dearborn, MI (US)

(72) Inventors: Raj Sohmshetty, Canton, MI (US); Peter A. Friedman, Ann Arbor, MI (US); Kevin Richard John Ellwood, Ann Arbor, MI (US); Dimitar Petrov Filev, Novi, MI (US); Shie Mannor, Haifa (IL); Udy Danino, Rehovot (IL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/119,271

(22) Filed: Dec. 11, 2020

(51) Int. Cl.
  *G01V 8/12* (2006.01)
  *G06V 40/10* (2022.01)
  *G06V 40/20* (2022.01)

(52) U.S. Cl.
  CPC .............. *G06V 40/103* (2022.01); *G01V 8/12* (2013.01); *G06V 40/23* (2022.01)

(58) Field of Classification Search
  None
  See application file for complete search history.

(56) References Cited

U.S. PATENT DOCUMENTS

| | | | |
|---|---|---|---|
| 9,524,426 B2 | 12/2016 | Kim et al. | |
| 10,186,130 B2 | 1/2019 | Whelan et al. | |
| 2012/0062725 A1 | 3/2012 | Wampler, II et al. | |
| 2017/0355079 A1* | 12/2017 | Takahashi | B25J 9/1676 |
| 2021/0053224 A1* | 2/2021 | Schroeder | B25J 9/1653 |

FOREIGN PATENT DOCUMENTS

| | | |
|---|---|---|
| CN | 109492602 | 3/2019 |
| WO | 2018191555 | 10/2018 |

\* cited by examiner

*Primary Examiner* — Samuel D Fereja
(74) *Attorney, Agent, or Firm* — Burris Law, PLLC (57) ABSTRACT

The method of monitoring an operation includes acquiring data from sensors including images of a workspace in which the operation is to be performed, identifying a human operator and a controlled element within the workspace using the acquired images, determining whether the operation has initiated based on a known activation trigger, estimating pose of the human operator using the images, monitoring state of the controlled element based on acquired data, and determining whether an abnormality occurred based on the estimated pose, the state of the controlled element, a duration of the operation, or a combination thereof.

14 Claims, 4 Drawing Sheets

METHOD AND SYSTEM FOR MONITORING MANUFACTURING OPERATIONS USING COMPUTER VISION FOR HUMAN PERFORMED TASKS

FIELD

The present disclosure relates to method and/or system for monitoring an operation performed by a human such as a manufacturing operation in a manufacturing facility.

BACKGROUND

The statements in this section merely provide background information related to the present disclosure and may not constitute prior art.

While advancements in factory automation have been made, quality issues can still occur due to, for example, human error. Computer vision systems can be employed to monitor human operators, and, in some applications, such systems employ deep learning neural networks. However, such deep learning systems require significant amount of training data that and may be easily influenced by variations (e.g., varying height of operators, varying types of clothes, and/or left hand vs. right hand).

These and other issues related to monitoring an operation are addressed by the present disclosure.

SUMMARY

This section provides a general summary of the disclosure and is not a comprehensive disclosure of its full scope or all of its features.

In one form, the present disclosure is directed toward a method of monitoring an operation. The method includes acquiring data from sensors including images of a workspace in which the operation is to be performed, identifying a human operator and a controlled element within the workspace using the acquired images, determining whether the operation has initiated based on a known activation trigger, estimating pose of the human operator using the images, monitoring state of the controlled element based on acquired data, and determining whether an abnormality occurred based on the estimated pose, the state of the controlled element, a duration of the operation, or a combination thereof.

In some variations, the pose of the human operator is estimated, the state of the controlled element is monitored, or a combination thereof is performed in response to the operation being initiated.

In some variations, the method further includes determining, during the operation, whether the estimated pose is abnormal based on a pose benchmark parameter associated with the operation, where the abnormality is determined to occur when the estimated pose is outside the pose benchmark parameter.

In some variations, the method further includes determining, during the operation, whether the state of the controlled element is satisfied based on an element benchmark parameter associated with the controlled element, where the abnormality is determined to occur when the state of the controlled element does not satisfy the element benchmark parameter.

In some variations, the method further includes determining the duration of the operation, and comparing the duration of the operation with a duration benchmark parameter associated with the operation, where the abnormality is determined to occur when the duration is greater than or less than that of the duration benchmark parameter.

In some variations, the method further includes determining whether the operation has ended based on a known completion trigger In some variations, the controlled element includes a workpiece, a tool, a part to be attached to the workpiece, or a combination thereof.

In some variations, the method further includes defining one or more tasks for performing the operation, acquiring images of the tasks being performed over a period of time, where the operation is repeatedly performed during the period of time, and determining, based on the images, the known activation trigger indicating start of the operation and one or more direct-indirect parameters and an associated benchmark parameter.

In some variations, the one or more direct-indirect parameters includes a direct parameter to assess whether the controlled element satisfies a respective benchmark parameter and indirect parameter to assess whether the estimated pose of the human operator satisfy a respective benchmark parameter.

In some variations, the method further includes issuing a notification to a user interface, an external system, or a combination thereof in response to the abnormality being detected.

In some variations, estimating the pose of the human operator further includes identifying and tracking one or more key-points of the human operator.

In some variations, the method further includes comparing learned data based on data from one or more previous executions of the operation with the data from a current execution of the operation to determine occurrence of the abnormality.

In one form, the present disclosure is directed toward a monitoring system for monitoring an operation. The monitoring system includes a processor and a nontransitory computer-readable medium including instructions that are executable by the processor. The instructions include identifying a human operator and a controlled element within a workspace based on data acquired from sensors within the workspace in which the operation it to be performed, where the data includes images. The instruction further include determining whether the operation has initiated based on a known activation trigger, estimating pose of the human operator using the images, monitoring state of the controlled element based on acquired data, and determining whether an abnormality occurred based on the estimated pose, the state of the controlled element, a duration of the operation, or a combination thereof.

In some variations, the instructions further include estimating the pose of the human operator, monitoring the state of the controlled element, or a combination thereof in response to the operation being initiated.

In some variations, the instructions further include determining, during the operation, whether the estimated pose is abnormal based on a pose benchmark parameter associated with the operation, where the abnormality is determined to occur when the estimated pose is outside the pose benchmark parameter.

In some variations, the instructions further include determining, during the operation, whether the state of the controlled element is satisfied based on an element benchmark parameter associated with the controlled element, where the abnormality is determined to occur when the state of the controlled element does not satisfy the element benchmark parameter.

In some variations, the instructions further include determining the duration of the operation and comparing the duration of the operation with a duration benchmark parameter associated with the operation, where the abnormality is determined to occur when the duration is greater than or less than that of the duration benchmark parameter.

In some variations, the instructions further include determining whether the operation has ended based on a known completion trigger.

In some variations, the instruction for estimating the pose of the human operator further includes identifying and tracking one or more key-points of the human operator.

In one form, the present disclosure is directed toward a method of monitoring an operation. The method includes acquiring data from sensors including images of a workspace in which the operation is to be performed, identifying a human operator and a controlled element within the workspace using the acquired images, detecting a known activation trigger indicative of a start of the operation based on the images acquired, estimating, in real-time, pose of the human operator during the operation based on the images, determining, during the operation, whether the estimated pose is abnormal based on a pose benchmark parameter associated with the operation, monitoring state of the controlled element during the operation based on acquired data, determining, during the operation, whether the state of the controlled element is abnormal based on an element benchmark parameter associated with the controlled element, detecting a known completion trigger indicative of an end of the operation based on the images, and performing a remedial action in response to an abnormal operation being detected, where the abnormal operation includes the estimated pose being abnormal, the state of the controlled element being abnormal, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
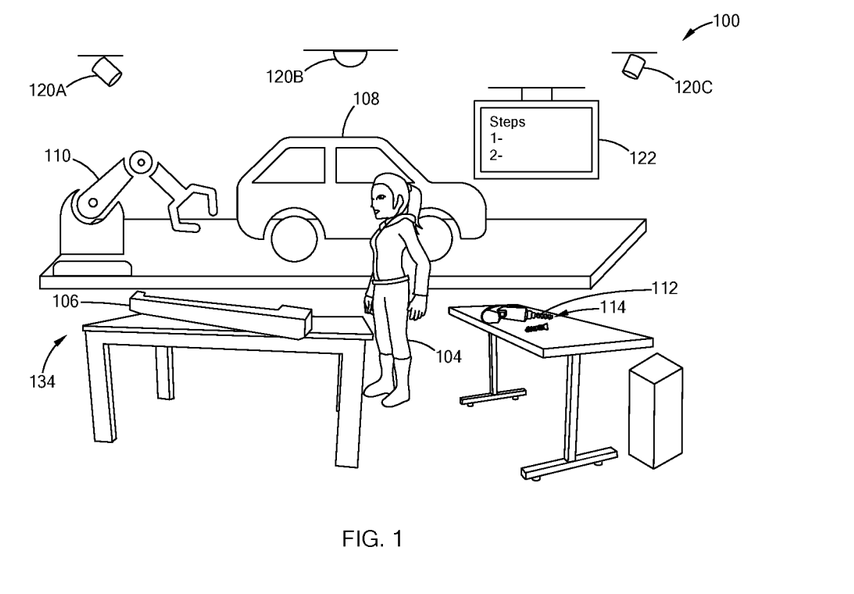
FIG. 1 illustrates a workspace in a facility in accordance with the present disclosure.

Referring to FIG. 1, a workspace 100 provided in a facility is a collaborative environment in which a human operator 104 interfaces with various controlled elements to perform a manufacturing operation. In one form, the manufacturing operation is defined by one or more tasks. As an example, the operator 104 assembles a workpiece, such as a bumper 106, onto a vehicle 108 and the steps may include: a robotic system 110 moving the bumper 106 to the vehicle 108; the operator 104 moving a power tool 112 and fasteners 114 from a staging area 116; the operator 104 securing the bumper 106 to the vehicle 108 via the power tool 112 and the fasteners 114; and the operator 104 returns the power tool 112 to the staging area 116. As used herein, controlled element includes vehicle workpieces, electronic devices (e.g., power tools, measuring devices, etc.), robotic systems, fasteners, among other components related to the manufacturing operation. Accordingly, in the example provided, the controlled elements may include the robotic system 110, the bumper 106, the vehicle 108, the power tool 112, and/or the fastener 114.

Figure 2:
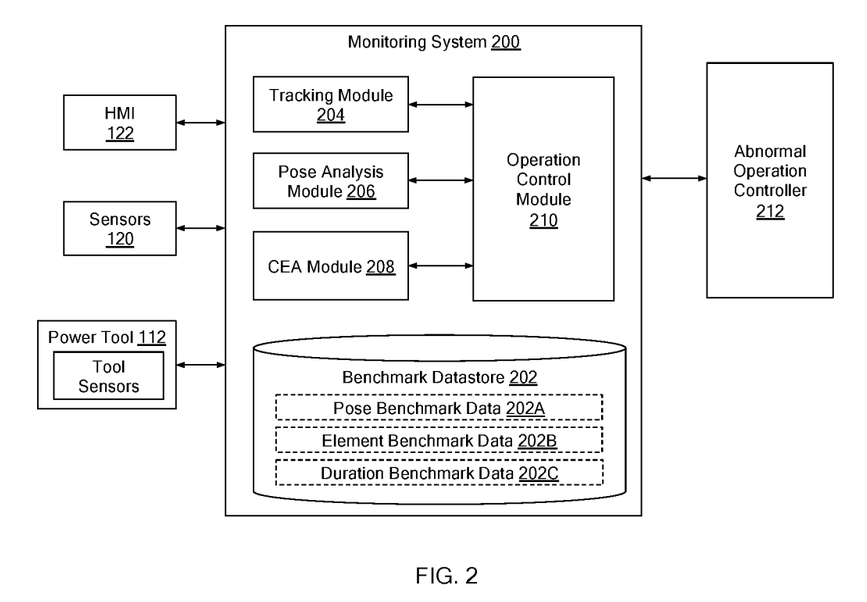
FIG. 2 is a block diagram of a system for monitoring the workspace in accordance with the present disclosure.

Referring to FIG. 2, the present disclosure provides for a monitoring system 200 for an operation performed by a human operator such as the one described with respect to FIG. 1. In one form, the monitoring system 200 of the present disclosure employs both direct and indirect monitoring techniques for tracking progress of the operation and flagging possible abnormalities related to the operation. In an exemplary application, direct monitoring techniques include analyzing before and after images of the workspace to determine placement/position of controlled elements (e.g., before and after images of the vehicle) and indirect monitoring techniques include analyzing movement of the operator. While specific examples are provided, other direct and indirect monitoring techniques may also be employed. While the monitoring system 200 of the present disclosure is described in association with a manufacturing operation, the monitoring system 200 may be employed for monitoring other operations having one or more tasks performed by a human operator such as, but not limited to, quality inspection in which the human operator evaluates/tests a product/device or an agricultural operation in which the human operator repairs equipment and/or tends to a parcel of land (e.g., seeding, plowing, etc.). In addition, in one form, the operation may be performed by one or more human operators or by a combination of one or more human operators and one or more robots. That is, the operation is not limited to having only one robot and one human as illustrated in FIG. 1.

As provided herein, in one form, the monitoring system 200 is configured to determine the start and end of the operation based upon an activation trigger and a completion trigger associated with the operation. Once initiated, the monitoring system monitors one or more controlled elements and a pose of the operator in accordance with one or more direct and/or indirect parameters (collectively "direct-indirect parameters"). The monitoring system 200 may also determine if an abnormal operation has occurred based on benchmark parameters associated with direct-indirect parameters and perform a remedial action, such as providing a notification to the human operator, transmitting data to a secondary controller for further analysis, among other actions. As an example, if the duration of the manufacturing operation exceeds a benchmark time period (too short or too long), the monitoring system 200 may flag the manufacturing operation as being abnormal and request further review by an operator and/or external system. As provided in detail below, the monitoring system 200 for a given manufacturing operation undergoes a benchmarking stage to thoroughly define tasks associated with the manufacturing operation, to define direct-indirect parameters used for evaluating the manufacturing operation, and benchmark parameters for determining abnormal operations. The monitoring system 200 may then be deployed for the operation.

In one form, the monitoring system 200 employs data from one or more sensors 120A, 120B, 120C (collectively "sensors 120") disposed at the workspace 100 for tracking the operator 104 and/or the controlled element. As an example, the sensors 120 includes, but is not limited to: two-dimensional cameras, three-dimensional cameras, infrared cameras, LIDARs (light detection and ranging), laser scanners, radars, accelerometers, and/or electromagnetic wave sensors such as microphones and/or monocular cameras.

The monitoring system 200 may also receive data from other electronic devices, such as, but not limited to, the power tool 112, and/or the robotic system 110. For example, in one form, the power tool 112 includes sensors disposed therein, which are referred to as tool sensor(s), for measuring performance of the power tool 112. The tool sensors may include, but are not limited to a torque sensor, a power sensor to measure current and/or voltage being applied by the supplementary power source, an accelerometer to measure a vibration profile during operation, a touch sensor at the handle to detect contact, and/or a contact sensor at a chuck of the power tool to detect the presence of a bit/fastener within the chuck. While the power tool 112 is provided as a drill motor, other power tools may be used and thus, the tool sensor for the power tool may include other types of sensors. While data from electronic controlled elements may be used, it is not required.

In one form, the monitoring system 200 is configured to exchange information with the operator 104 by way of one or more human machine interfaces (HMIs), such as a monitor 122 provided in FIG. 1. Other HMIs may be employed such as audio system (microphone and speakers), touchscreen displays, portable computing devices (e.g., tables in communication with the monitoring system), among others.

With continuing reference to FIG. 2, in an exemplary embodiment, the monitoring system 200 includes a benchmark datastore 202, a tracking module 204, a pose analysis module 206, a controlled element analysis (CEA) module 208, and an operation control module 210. The benchmark datastore 202 is a memory device that stores data for one or more benchmark parameters. In one form, the benchmark datastore 202 stores a pose benchmark data 202A, an element benchmark data 202B, and a duration benchmark data 202C.

The benchmark parameters are provided as criteria for selected direct-indirect parameters used to monitor the manufacturing operation, where the direct-indirect parameters are detectable/measurable parameters for evaluating the operation. In one form, the direct-indirect parameters include an activation trigger, a completion trigger, a duration of the operation, an operator pose, and/or a state of a controlled element (e.g., position, location, movement, etc.). As mentioned above, to define such criteria, the operation undergoes a benchmarking stage (i.e., an observation period). Specifically, in one form, the operation is generally defined by one or more tasks, and based on the tasks, data from various sensors disposed throughout the workspace is collected and analyzed to define or select the direct-indirect parameters and the associated benchmark parameter. Various techniques such as, but not limited to, machine learning based video analysis, object detection models, among others, are used to define direct-indirect parameters for monitoring the operation and the associated benchmark parameters for detecting abnormal operations.

In one form, the data acquired during the benchmarking stage is reflective of the operation being repeatedly performed over a period of time, and in some forms, is performed to account for different variables, such as different human operators, different brand power tools, among others. By way of example, with respect to the manufacturing operation illustrated in FIG. 1, data regarding movement of the operator 104 and/or state of the controlled elements is used to determine an activation trigger for indicating start of the monitoring process of the manufacturing operation and a completion trigger for indicating the end of monitoring process of the manufacturing operation. In one form, the activation trigger and/or completion trigger (collectively "triggers") includes one or more actions performed at the beginning/end of the manufacturing operation. For example, the actions may include but is not limited to: a pose of the operator (e.g., the operator reaching a location within the working space, the operator standing with arms down by the side, and/or the operator manipulating a controlled element); movement of a controlled element such as the workpiece arriving at the workspace (e.g., vehicle/bumper arriving at the workspace), a power tool removed from/returned to a designated location (e.g., holder, table); and/or automated action by a robotic system/machinery (the robotic system picking up the bumper). In one form, the completion trigger may be the same as the activation trigger. That is, the completion trigger may be the start of a new operation as identified by the activation trigger.

Figure 3:
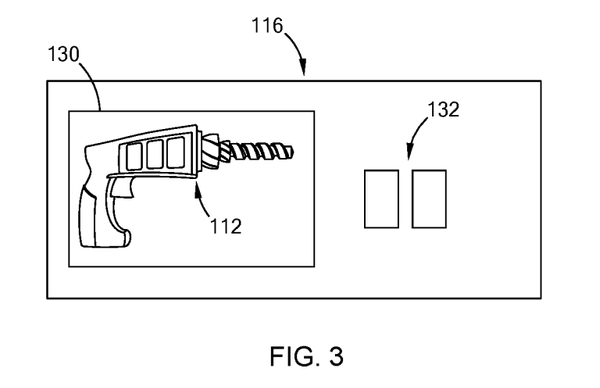
FIG. 3 illustrates a table having a power tool in accordance with the present disclosure.

In one form, the data acquired is used to learn about the state of one or more controlled elements in the workspace at various stages of the operation to identify one or more direct parameters. For example, with reference to FIG. 3, the power tool 112 of FIG. 1 is located within a designated location 130 of the staging area 116 with the fasteners to be disposed at fastener location 132. Based on the tasks described above with respect to the manufacturing operation of FIG. 1, the fastener location 132 will have the fasteners 114 at the start of the manufacturing operation and will be empty at the end of the manufacturing operation (as illustrated in FIG. 3). In addition, the power tool 112 will be removed from the designated location 130 and then returned once the bumper 106 is secured. The movement of these controlled elements can be visually tracked by way of cameras and can be employed as direct parameters for monitoring the manufacturing operation. In addition to and/or in lieu of, the power tool 112 and fastener 114, the state of other controlled elements may also be used as direct parameters such as the robotic system 110 (e.g., movement of the robotic system at selected tasks of the manufacturing operation), the bumper 106 (e.g., before and after images of a staging area 134 holding bumper 106), and/or the vehicle 108 (e.g., before and after images of the vehicle). While specific visual direct parameters are provided, other visual based parameters may also be defined.

In addition to visual inspection, data regarding the performance of an automated device (e.g., the robotic system) and/or an electronic device (e.g., the power tool) may also be employed as a direct parameter. For example, the amount of torque used by the power tool 112 may be provided as a direct parameter and the requisite amount of torque used to install fasteners 114 is provided as the benchmark parameter, which is to be satisfied for the installation of the fasteners 114 to be acceptable. Other measurable performance characteristics of the power tool 112 may also be used as a direct parameter for the manufacturing operation (e.g., signal from a touch sensor disposed on a handle of the tool), and should not be limited to the examples provided herein.

Based on the evaluation of the various controlled elements, one or more direct parameters associated with one or more controlled elements is defined. In addition, the direct parameters based on the controlled elements is associated with an element benchmark parameter to be employed for detecting abnormal operations.

Figure 4A:
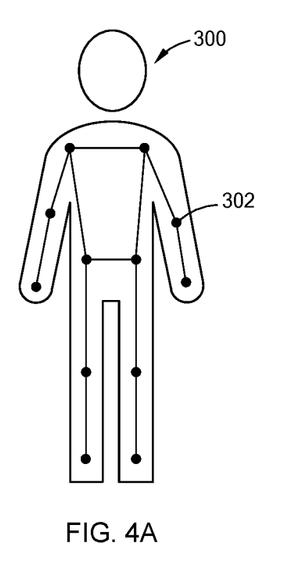
FIGS. 4A and 4B illustrate a key-point pose of a human in accordance with the present disclosure.
Figure 4B:
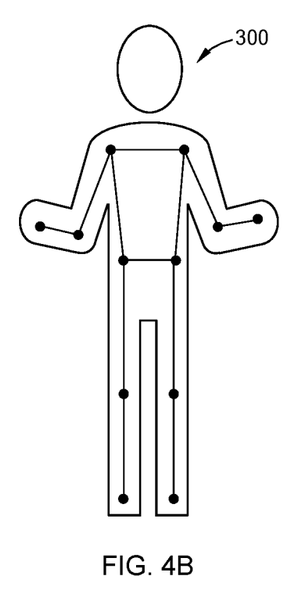

In one form, the data acquired is also used to track and learn about the movement of the operator which can be used for one or more indirect parameters for monitoring the operation. For example, with reference to the manufacturing operation of FIG. 1, the operator 104 may make substantially the same poses to perform certain tasks such as lifting the power tool 112 and/fasteners 114, standing near the vehicle 108 with power tool 112, raising/lowering arms to secure the bumper 106 to the vehicle 108 with the fastener 114 and power tool 112, and/or having arms at side after returning the power tool 112. In one form, known pose trace and estimation techniques are employed for tracking and learning the pose of the operator 104. More particularly, pose estimation is a computer vision technique to detect a human figure in a video and ascertain location of body parts, such as hand, head, leg, feet, etc. Referring to FIGS. 4A and 4B, a human FIG. 300 is segmented in multiple key-points 302 that can be traced to determine a pose of the human FIG. 300 (e.g., FIG. 4A human FIG. 300 is in a standing pose with arms at the side and in FIG. 4B the human FIG. 300 has a pose with arms out). Various pose estimation techniques may be employed for real-time human estimation, such as but not limited to, PoseNet type machine learning model and OpenPose-type model. By employing the pose estimation techniques, a benchmark pose parameter can be defined for evaluating the movement of the operator during the operation.

In addition to the pose of the operator and the manipulation of one or more controlled elements, other characteristics of the operation may also be determined, such as time. More particularly, a direct parameter can include a time characteristic such as, but not limited to, the duration of the operation (i.e., time between activation trigger and deactivation trigger), time between selected tasks (e.g., time it takes the robotic system 110 to move the bumper 106 and/or time it takes the operator 104 to place fasteners 114), and/or time, between the activation trigger and the last task performed by the operator 104. Based on the data acquired during the benchmark stage, specific duration parameters can be defined and associated with a respective duration benchmark parameter. In one form, the duration can be monitored by recognizing the start and end of each defined duration via images from the cameras and tracking time with an internal clock of the monitoring system.

Referring back to FIG. 2, the tracking module 204 is configured to detect the start and end of the operation based on the known activation trigger and the known completion trigger defined during the benchmark stage. As an example, if the activation trigger is the movement of the bumper 106 from the staging area 134 by the robotic system 110, the tracking module 204 may use images from sensors 120 to determine when the bumper 106 is lifted. In another example, if the activation trigger is when the operator 104 uses the power tool 112, the tracking module 204 uses images and/or data from the power tool 112 to determine when the operator 104 engages with the power tool 112. In one form, the activation trigger may include multiple actions and not just one action. For example, the activation trigger may include both the movement of the bumper 106 and the power tool 112. While specific examples of the activation trigger are provided, the activation trigger may be defined in various suitable ways and should not be limited to examples provided herein. A similar evaluation is performed for detecting the completion trigger.

The pose analysis module 206 is configured to track and analyze movement of the operator using real-time pose estimation techniques provided above. In one form, in response to the operation being initiated, the pose analysis module 206 estimate the pose of the operator by tracing one or more pose key-points associated with the operator using images of the workspace. The pose analysis module 206 further compares the traced pose-key-points to benchmark key-points associated with the operation to determine an abnormal operation. Accordingly, when the real-time traced pose key-points are outside the benchmark key-points, the pose analysis module 206 determines an abnormality in the operation. For example, if the bumper 106 is misaligned with the vehicle 108, the key-point associated with the operator 104 arms may be higher or lower than respective benchmark key-points. In one variation, if the pose of the operator is not employed for as an activation trigger, the pose analysis module 206 may begin in response to the start of the operation. In another variation, the pose analysis module 206 may continuously monitor the pose of the operator 104 if the activation trigger includes a pose of the operator 104. In one form, the benchmark key-points are stored as pose benchmark data in the datastore 202.

The CEA module 208 is configured to monitor state of one or more controlled elements in accordance with defined direct parameters and analyze the state based on respective element benchmark parameter associated with the controlled element. As an example, with reference to FIG. 3, the CEA module 208 is configured to determine if the power tool 112 is positioned at designated location 130 before the manufacturing operation begins, if the power tool 112 is moved from the designated location 130 and/or if the power tool 112 is returned to the designated location 130. If one or more determinations are not satisfied, the CEA module 208 determines an abnormal operation has occurred. In another example, the CEA module 208 monitors the fasteners 114 to determine if the fasteners 114 are at the designated location 132 before the start of the manufacturing operation and if the fasteners 114 are moved from the location 132 prior to the end of the manufacturing operation. If one or more determinations are not satisfied, the CEA module 208 determines an abnormal operation has occurred.

In one form, the CEA module 208 employs known object detection techniques based on real-time images of the workspace and on benchmark images. The benchmark images may include, but is not limited to, one or more images of: the controlled element(s) (e.g., power tool 112, fastener 114, bumper 106, vehicle 108, among others); the requisite position of the controlled element (e.g., location 130 for the power tool 112, location 132 for the fastener, among others); and/or the controlled element in its before and after state (e.g., the vehicle 108 before and after the bumper 106 is assembled thereon). The benchmark images are stored in the benchmark datastore 202 as part of the element benchmark data. While specific examples of benchmark images are provided, other benchmark images may be used based on the defined direct parameter and associated element benchmark parameter to be satisfied and should not be limited to the examples provided herein. In addition, while specific determinations made by the CEA module 208 for selected controlled elements are provided, the CEA module 208 may be configured in various suitable ways to directly monitor one or more controlled elements based on the defined direct parameters and should not be limited to the example provided herein. For example, the CEA module 208 is configured to determine whether the bumper 106 is attached to the vehicle 108, and if the bumper 106 is not attached at the end of the manufacturing operation, the CEA module 208 determines the occurrence of an abnormal operation. In another example, if the direct parameter relates to performance characteristics of the power tool 112, the CEA module 208 is configured to determine an abnormal operation, if one or more performance characteristics does not satisfy requisite thresholds (i.e., benchmark parameters).

Based on the determinations from the tracking module 204, the pose analysis module 206, and the CEA module 208, the operation control module 210 monitors the progress of the operation and if one or more abnormal operations is detected, the operation control module 210 take a remedial action based on the abnormality. More particularly, in one form, the operation control module 210 is configured to provide the same remedial action regardless of the abnormality detected and/or the number of abnormalities detected. In another form, the operation control module 210 is configured to provide different remedial actions based on the abnormality and/or the number of abnormalities. For example, if the pose analysis module 206 detects an abnormal operation based on the pose of the operator 104, but the CEA module 208 does not issue an abnormal operation, the operation control module 210 is configured to provide a different remedial action than if the CEA module 208 had also detected an abnormal operation. The remedial action may include, but is not limited to: issuing a notification via one or more HMI to notify the operator of the abnormal operation, transmitting data indicative of the abnormal operation to a secondary controlled (e.g., abnormal operation controller), and/or stopping further progress of the operation by turning off power to one or more electronic devices.

In one form, the monitoring system 200 is communicably coupled to an abnormal operation controller 212 via wired and/or wireless communication links to provide information regarding the operation and more particularly, data indicative of an abnormal operation. In one form, the abnormal operation controller 212 is configured to further analyze the data received to determine the cause of the abnormal operation(s). This information may be employed to improve the monitoring system 200 and/or the operation. By way of example, the abnormalities related to the pose of the operator 104 may indicate that the key-point generating the abnormality can vary significantly based on the worker, and thus, the pose analysis module 206 may adjust its analysis to review other key-points when determining abnormality. In one form, the abnormal operation controller 212 may include machine learning algorithms to process the data from the operation control module 210, identify trends, and provide suggestions. The abnormal operation may also be configured for long-term storage of data from the monitoring system 200.

With the monitoring system 200 and the abnormal operation controller 212, the operation undergoes a multi-layer evaluation. Specifically, the monitoring system 200 employs direct and indirect monitoring techniques to observe the operation to detect abnormal operations and the abnormal operation controller 212 identifies the actions causing the abnormality to further improve the operation and/or the monitoring system 200. In addition, the monitoring system 200 employs indirect monitoring techniques of the operator without the use of deep learning networks that can vary based on different physical characteristics of the operator. This allows for a less complex system while still effectively monitoring the operator.

Figure 5:
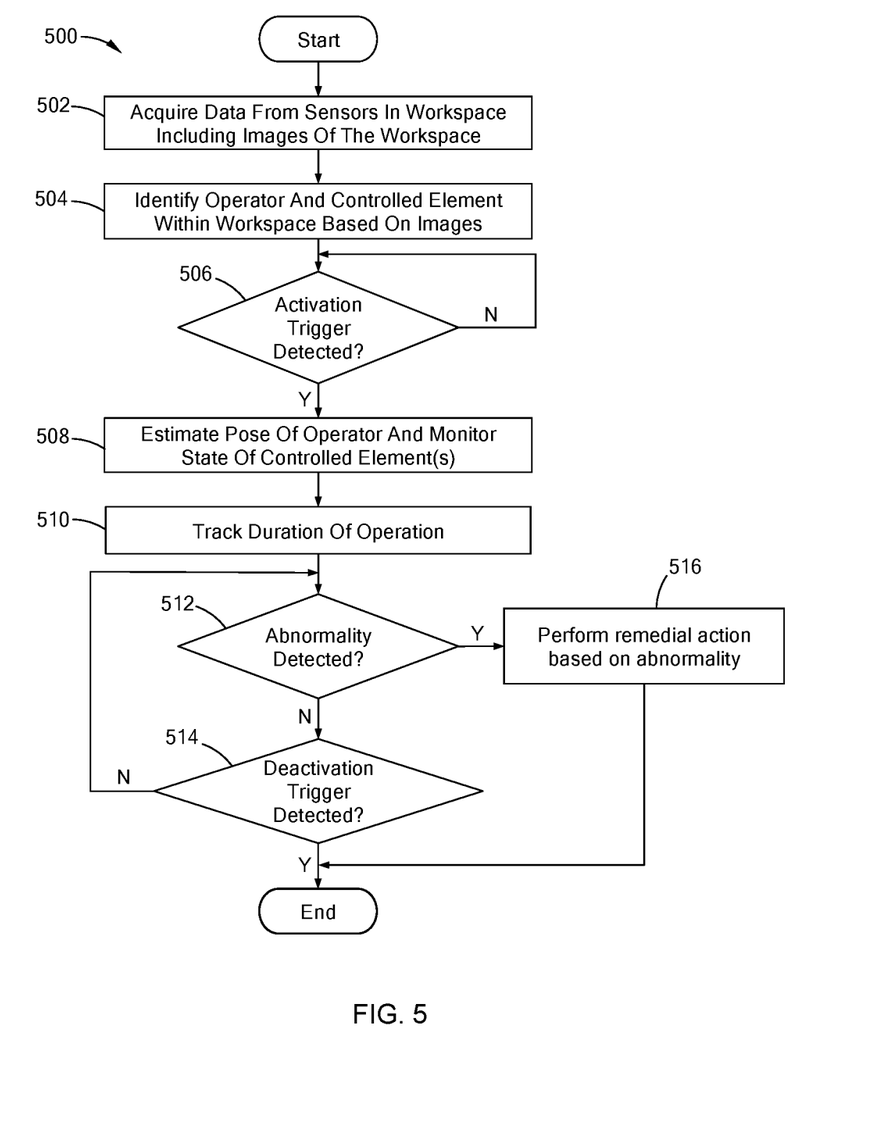
FIG. 5 is a flowchart of an exemplary monitoring routine in accordance with the present disclosure.

Referring to FIG. 5, an example monitoring routine 500 is provided and executable by the monitoring system of the present disclosure. At 502, the system acquires data from the sensors in the workspace including images and at 504, identifies the operator and the controlled element(s) based on the images. For example, in one form, the monitoring system operates a computer vision system utilized known object detection techniques to detect the operator and one or more controlled elements. At 506, the system determines whether an activation trigger is detected. Specifically, based on the known activation trigger defined for the manufacturing method, the system analyzes the data from the sensors to determine whether activation trigger was performed or, in other words, satisfied. It should be readily understood that the system continuously receives data from the sensors of the workspace throughout the routine 500 and updates the analyses being performed throughout the routine 500.

If the activation trigger is detected, the monitoring system estimates the pose of the operator and monitors the state of one or more controlled elements, at 508. Specifically, based on the direct-indirect parameters employed for the operations, the monitoring system estimates the pose of the operator by identifying and tracking key-points of the operator, as described above, and compares the estimated pose to the pose benchmark parameters. In addition, for a designated controlled element, the system 200 determines if the direct parameters associated with the designated controlled element satisfies a respective element benchmark parameter. At 510, the system tracks the duration of the operation.

At 512, the system determines if an abnormality was detected. That is, based on the estimated pose of the operator, the state of the controlled element(s), and/or the duration of the operation, the system may determine an abnormality has occurred if any of the parameters fail to satisfy a respective benchmark parameter. If no abnormality is detected, the system determines whether the deactivation trigger is detected. If no deactivation trigger is detected, the system continues to monitor for possible abnormalities. If an abnormality is detected, the system performs a remedial action 516, as described above. It should be readily understood, that, the process of steps 508 and 510 are continuously performed by the routine 500 using data acquired from the sensor until, for example, an abnormality is detected or the deactivation trigger is detected.

The monitoring system may be configured in various suitable ways to perform the functions described herein and should not be limited to routine 500.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of monitoring an operation, the method comprising;
    acquiring data from sensors including images of a workspace at which the operation is to be performed;
    identifying a human operator and a controlled element within the workspace using the images;
    estimating a pose of the human operator using the images;
    monitoring a state of the controlled element based on the data;
    detecting a known activation trigger based on the estimated pose of the human operator, the state of the controlled element, or a combination thereof, wherein the known activation trigger indicates a start of the operation;
    tracking a duration of the operation in response to the known activation trigger being detected;
    determining whether an abnormality occurred based on the estimated pose of the human operator, the state of the controlled element, the duration of the operation, or a combination thereof;
    detecting a known completion trigger based on the pose estimated of the human operator, the state of the controlled element, or a combination thereof, wherein the known completion trigger indicates an end of the operation;
    determining the duration of the operation in response to the known completion trigger not being detected;
    determining whether the duration of the operation is greater than a duration benchmark parameter associated with the operation; and
    determining the abnormality occurred in response to the duration of the operation being greater than the duration benchmark parameter.

2. The method of claim 1 further comprising determining, during the operation, whether the estimated pose is abnormal based on a pose benchmark parameter associated with the operation, wherein the abnormality is determined to occur when the estimated pose is outside the pose benchmark parameter.

3. The method of claim 1 further comprising determining, during the operation, whether the state of the controlled element is satisfied based on an element benchmark parameter associated with the controlled element, wherein the abnormality is determined to occur when the state of the controlled element does not satisfy the element benchmark parameter.

4. The method of claim 1, wherein the controlled element includes a workpiece, a tool, a part to be attached to the workpiece, or a combination thereof.

5. The method of claim 1 further comprising:
    defining one or more tasks for performing the operation;
    acquiring images of the tasks being performed over a period of time, wherein the operation is repeatedly performed during the period of time; and
    determining, based on the images, the known activation trigger indicating the start of the operation and one or more direct-indirect parameters and an associated benchmark parameter.

6. The method of claim 5, wherein the one or more direct-indirect parameters includes a direct parameter to assess whether the controlled element satisfies a respective benchmark parameter and indirect parameter to assess whether the estimated pose of the human operator satisfy a respective benchmark parameter.

7. The method of claim 1 further comprising issuing a notification to a user interface, an external system, or a combination thereof in response to the abnormality being detected.

8. The method of claim 1, wherein estimating the pose of the human operator further comprises identifying and tracking one or more key-points of the human operator.

9. The method of claim 1 further comprising comparing learned data based on data from one or more previous executions of the operation with the data from a current execution of the operation to determine occurrence of the abnormality.

10. A monitoring system for monitoring an operation, the system comprising:

a processor; and a nontransitory computer-readable medium including instructions that are executable by the processor, wherein the instructions include:

identifying a human operator and a controlled element within a workspace based on data acquired from sensors within the workspace at which the operation it to be performed, wherein the data includes images;

estimating a pose of the human operator using the images;

monitoring a state of the controlled element based on the data acquired;

detecting a known activation trigger based on the pose estimated of the human operator, the state of the controlled element, or a combination thereof, wherein the known activation trigger indicates a start of the operation;

tracking a duration of the operation in response to the known activation trigger being detected;

determining whether an abnormality occurred based on the estimated pose, the state of the controlled element, the duration of the operation, or a combination thereof detecting a known completion trigger based on the pose estimated of the human operator, the state of the controlled element, or a combination thereof, wherein the known completion trigger indicates an end of the operation;

determining the duration of the operation in response to the known completion trigger not being detected;

determining whether the duration of the operation is greater than a duration benchmark parameter associated with the operation; and determining the abnormality occurred in response to the duration of the operation being greater than the duration benchmark parameter.

11. The monitoring system of claim 10, wherein the instructions further include determining, during the operation, whether the estimated pose is abnormal based on a pose benchmark parameter associated with the operation, wherein the abnormality is determined to occur when the estimated pose is outside the pose benchmark parameter.

12. The monitoring system of claim 10, wherein the instructions further include determining, during the operation, whether the state of the controlled element is satisfied based on an element benchmark parameter associated with the controlled element, wherein the abnormality is determined to occur when the state of the controlled element does not satisfy the element benchmark parameter.

13. The monitoring system of claim 10, wherein the instruction for estimating the pose of the human operator further includes identifying and tracking one or more keypoints of the human operator.

14. A method of monitoring an operation, the method comprising;

acquiring data from sensors including images of a workspace at which the operation is to be performed;

identifying a human operator and a controlled element within the workspace using the images;

detecting a known activation trigger indicative of a start of the operation based on the images;

tracking a duration of the operation in response to the known activation trigger being detected;

estimating, in real-time, a pose of the human operator during the operation based on the images;

determining, during the operation, whether the estimated pose is abnormal based on a pose benchmark parameter associated with the operation;

monitoring a state of the controlled element during the operation based on the data;

determining, during the operation, whether the state of the controlled element is abnormal based on an element benchmark parameter associated with the controlled element;

detecting a known completion trigger indicative of an end of the operation based on the images;

determining the duration of the operation in response to the known completion trigger not being detected;

determining whether the duration of the operation is greater than a duration benchmark parameter associated with the operation;

determining the abnormality occurred in response to the duration of the operation being greater than the duration benchmark parameter; and performing a remedial action in response to an abnormal operation being detected, wherein the abnormal operation includes the estimated pose being abnormal, the state of the controlled element being abnormal, the duration of the operation being greater than the duration benchmark parameter, or a combination thereof.

* * * * *